(12) United States Patent
Chi et al.

(10) Patent No.: US 9,891,676 B2
(45) Date of Patent: Feb. 13, 2018

(54) COMPUTER CASE

(71) Applicant: COOLER MASTER TECHNOLOGY INC., New Taipei (TW)

(72) Inventors: Chia-Hsiang Chi, New Taipei (TW); Yu-Qing Lyu, New Taipei (TW)

(73) Assignee: COOLER MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/616,172

(22) Filed: Jun. 7, 2017

(65) Prior Publication Data

US 2017/0269649 A1 Sep. 21, 2017

Related U.S. Application Data

(63) Continuation of application No. 14/795,696, filed on Jul. 9, 2015, now Pat. No. 9,727,103.

(30) Foreign Application Priority Data

Jun. 1, 2015 (TW) .............................. 104208639 U

(51) Int. Cl.
*H02G 3/08* (2006.01)
*G06F 1/20* (2006.01)
*G06F 1/18* (2006.01)

(52) U.S. Cl.
CPC ................ *G06F 1/20* (2013.01); *G06F 1/183* (2013.01)

(58) Field of Classification Search
CPC H02G 3/08; H02G 3/081; H05K 5/00; H05K 5/02; H05K 5/0204; H05K 5/0217; H05K 5/0247; H05K 7/20; H05K 7/20009; H05K 7/20136; H05K 7/20172; H05K 7/20572; H05K 7/20154; F04D 25/166; G06F 1/20; G06F 1/183
USPC ..... 174/50, 520, 535, 547, 548, 559, 17 VA; 220/3.2–3.9, 4.02; 361/600, 601, 641, 361/676, 677, 678, 679.02, 688, 694, 695
See application file for complete search history.

(56) References Cited

U.S. PATENT DOCUMENTS

| | | | | |
|---|---|---|---|---|
| 5,562,410 A * | 10/1996 | Sachs | ..................... | F04D 29/601 361/695 |
| 6,867,966 B2 * | 3/2005 | Smith | ................ | H05K 7/20581 361/679.02 |
| 6,878,874 B2 * | 4/2005 | Osborn | .............. | H05K 7/20736 174/17 VA |
| 7,245,485 B1 * | 7/2007 | Morrell | .............. | H05K 7/20736 361/688 |
| 7,436,665 B2 * | 10/2008 | Chen | ......................... | G06F 1/20 361/694 |
| 7,606,027 B2 * | 10/2009 | Takasou | ............. | H05K 7/20154 361/694 |
| 7,688,585 B2 * | 3/2010 | Yin | ........................ | F04D 25/166 361/695 |
| 7,701,713 B2 * | 4/2010 | Li | ........................ | F04D 25/0613 361/695 |

(Continued)

*Primary Examiner* — Angel R Estrada
(74) *Attorney, Agent, or Firm* — Maschoff Brennan

(57) ABSTRACT

A computer case includes a case body, a carrying structure and a cooler. The case body is with an opening formed thereon. The carrying structure is detachably connected to the case body from the outside and corresponds to the position of the opening. The cooler is fixed to the carrying structure. This way, computer peripherals can be installed without disassembling the case body.

20 Claims, 8 Drawing Sheets

(56) References Cited

U.S. PATENT DOCUMENTS

| | | | |
|---|---|---|---|
| 7,845,903 B2 * | 12/2010 | Li ...................... | H05K 7/20736 415/186 |
| 7,894,190 B2 * | 2/2011 | Davis ................. | H05K 7/20736 361/694 |
| 8,755,182 B2 * | 6/2014 | Noteboom ......... | H05K 7/20736 361/695 |

* cited by examiner

COMPUTER CASE

CROSS-REFERENCE TO RELATED APPLICATION

This application is a continuing application of U.S. patent application Ser. No. 14/795,696, filed on Jul. 9, 2015, which claims priority to TW104208639 filed Jun. 1, 2015, and entitled "COMPUTER CASE". The entire disclosures of the above applications are all incorporated herein by reference.

TECHNICAL FIELD

The disclosure relates to a case, more particularly to a case for a computer.

BACKGROUND

A general computer case mainly comprises a main frame and a plurality of shell plates covering each side of the main frame. The inside of the computer case is disposed with devices such as a motherboard, a graphics card, a sound interface card, hard drive(s), an optical drive and a power supply. For the need of certain devices, a cooler is further installed to perform heat dissipation.

However, the aforementioned devices are installed before being shipped. The users, therefore, cannot find appropriate spaces for computer peripherals such as external hard drives when they are needed. Moreover, it is required to disassemble the computer case and remove the original air-cooled radiator when replacing the air-cooled radiator with the water-cooled radiator for significantly improving the efficiency of heat dissipation. This is considerably complicated and inconvenient, and therefore needs to be improved.

SUMMARY

One purpose of the disclosure is to provide a computer case which is configured for computer peripherals to be installed thereon without disassembling case body.

To reach this goal, the disclosure provides a computer case comprising a case body, a carrying structure and a cooler. The case body is with an opening formed thereon. The carrying structure is detachably connected to the case body from the outside and corresponds to the position of the opening. The carrying structure has an accommodation space and at least one aperture. The opening, the accommodation space and the at least one aperture are communicated with each other. The accommodation space is located between the opening and the at least one aperture. The cooler is fixed to the carrying structure, and at least a part of the cooler is located in the accommodation space.

Also, to reach this goal, the disclosure provides a computer case comprising a case and a carrying structure. The case body is with an opening formed thereon. The carrying structure is detachably connected to the case body from the outside and corresponds to the position of the opening. The carrying structure has an accommodation space and at least one aperture. The opening, the accommodation space and the at least one aperture are communicated with each other. The accommodation space is located between the opening and the at least one aperture.

The disclosure further includes following effects. The carrying edge is for the lapping piece to be placed thereon and this facilitates the installment of the waterblock on the heat source of the motherboard, which reduces the time required during the installing process. Additionally, the use of the protruding portion effectively prevents the carrying structure from loosing and separating.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Figure 1:
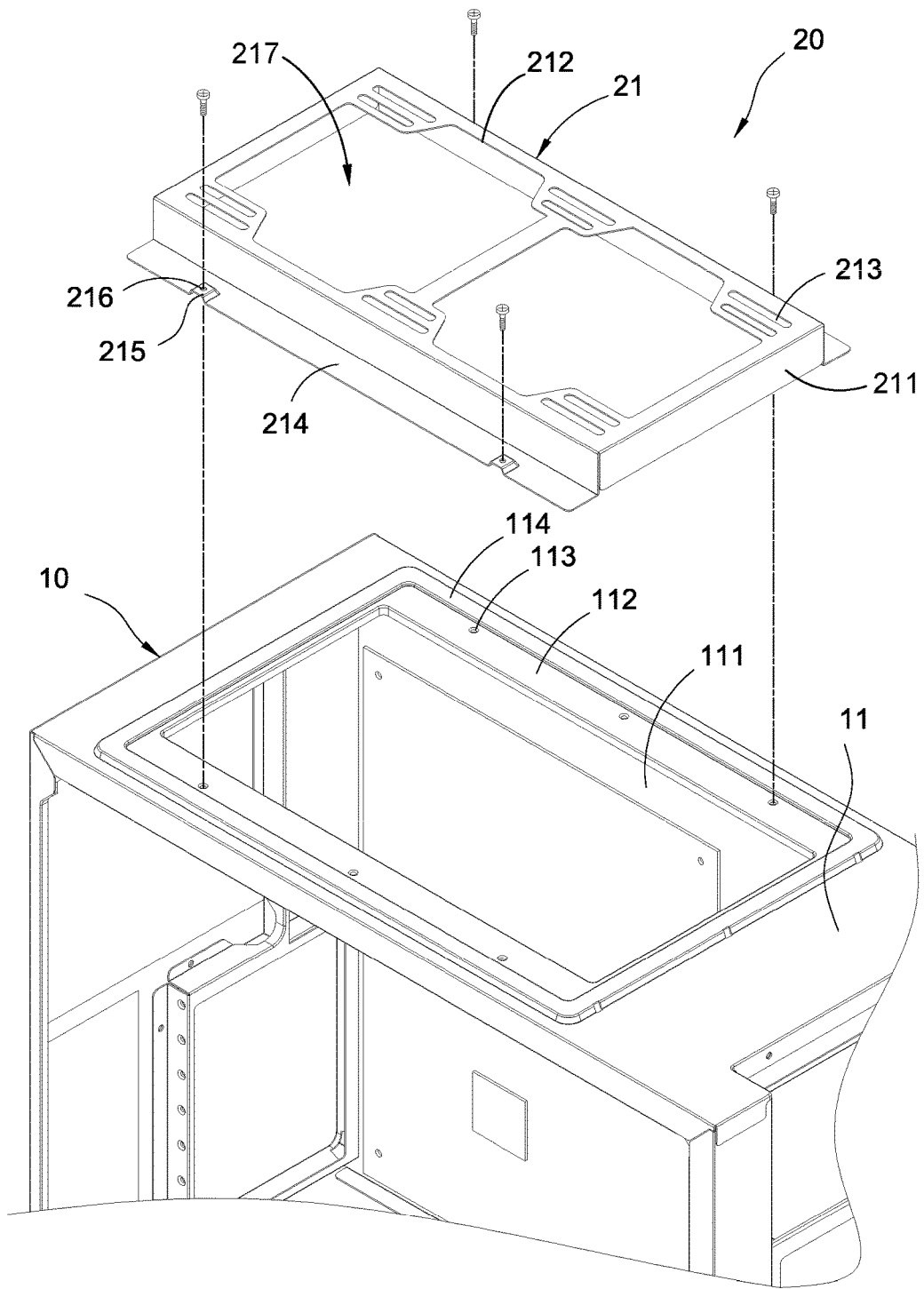
FIG. 1 is an exploded view of a computer case according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
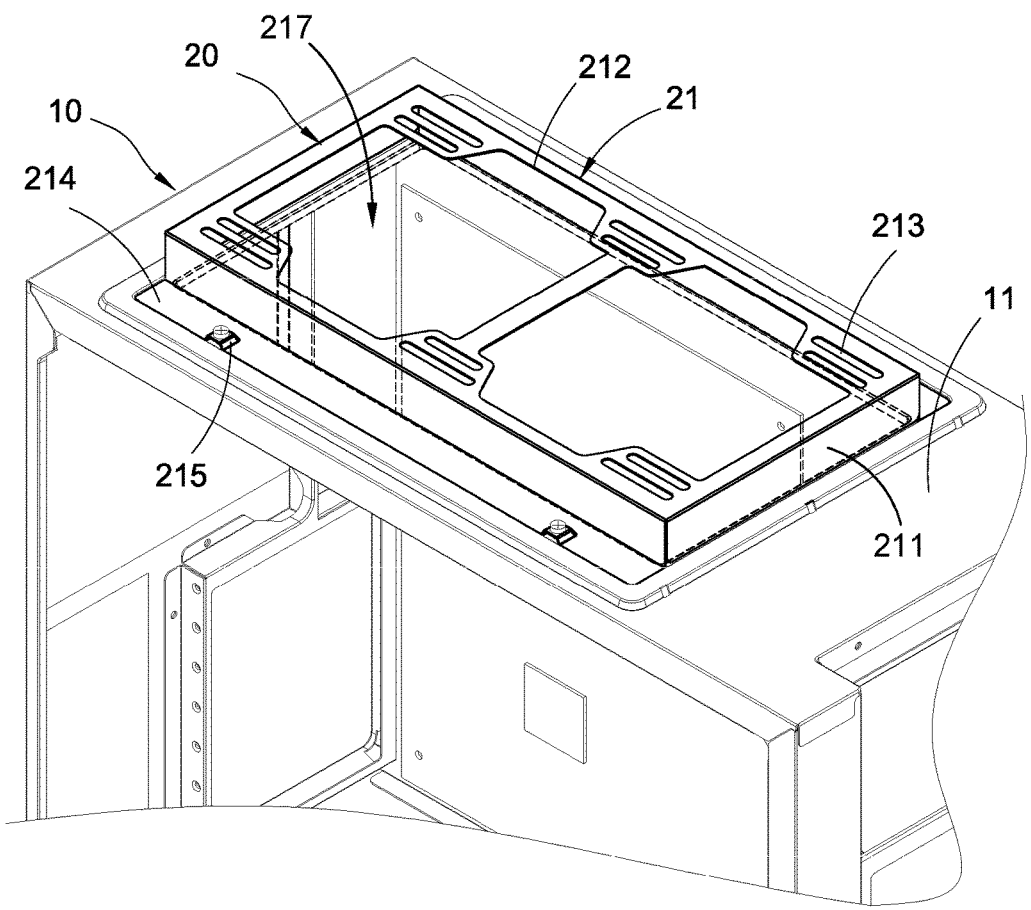
FIG. 2 is a perspective view of the combination of the computer case according to the first embodiment of the disclosure.

Referring to FIG. 1 and FIG. 2, the disclosure provides a computer case mainly comprising a case body 10 and a carrying structure 20.

The case body 10 is made of, for example, metal materials, and is roughly a hollow rectangular frame. The case body 10 has a top plate 11 with a rectangular opening 111 formed thereon. The edge of the opening 111 forms a carrying edge 112. A plurality of screwing holes 113 is formed on the carrying edge 112 while a rectangular rim 114 is formed around the edge of the carrying edge 112.

The carrying structure 20 is for a computer peripheral such as, an external hard drive, a disk drive or a cooler, to be fixed thereto. In this embodiment, the carrying structure 20 is a stand 21 mainly comprising a rectangular frame 211 and a lapping piece 214 extending from two corresponding sides of the rectangular frame 211. The stand 21 has an accommodation space 217 and two apertures 212. The accommodation space 217 is defined by the rectangular frame 211. Two apertures 212 and a plurality of striped grooves 213 are disposed on the top plate of the rectangular frame 211. Each lapping piece 214 forms a plurality of protruding portions 215. Each protruding portion 215 is with a through hole 216 formed thereon, for a screwing member such as a screw to go through the through hole 216 for locking. The stand 21 is detachably connected to the case body 10 from the outside and corresponding to the position of the opening 111. The stand 21 laps over the opening 111, and a part of the stand 21 protrudes from the case body 10. The lapping piece 214 laps over the top of the carrying edge 112 and be positioned and restricted by the rectangular rim 114. The opening 111, the accommodation space 217 and the two apertures 212 are communicated with each other. The accommodation space 217 is located between the opening 111 and the two apertures 212. In this embodiment, the number of the aperture is two, but the present disclosure is not limited thereto. In other embodiments, the number of the aperture can be one or more than two.

Figure 3:
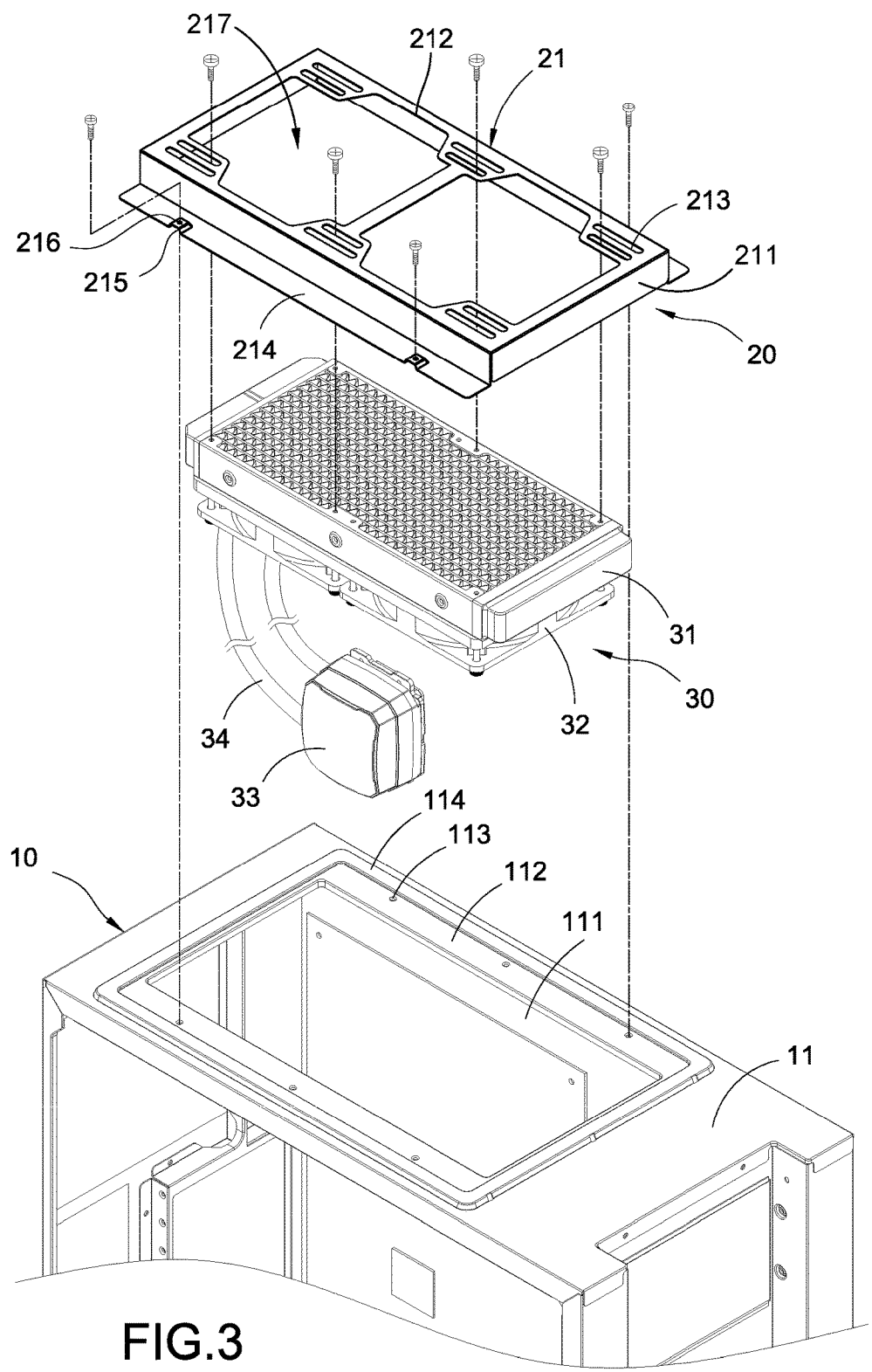
FIG. 3 is an exploded view of a computer case according to the second embodiment of the disclosure.
Figure 4:
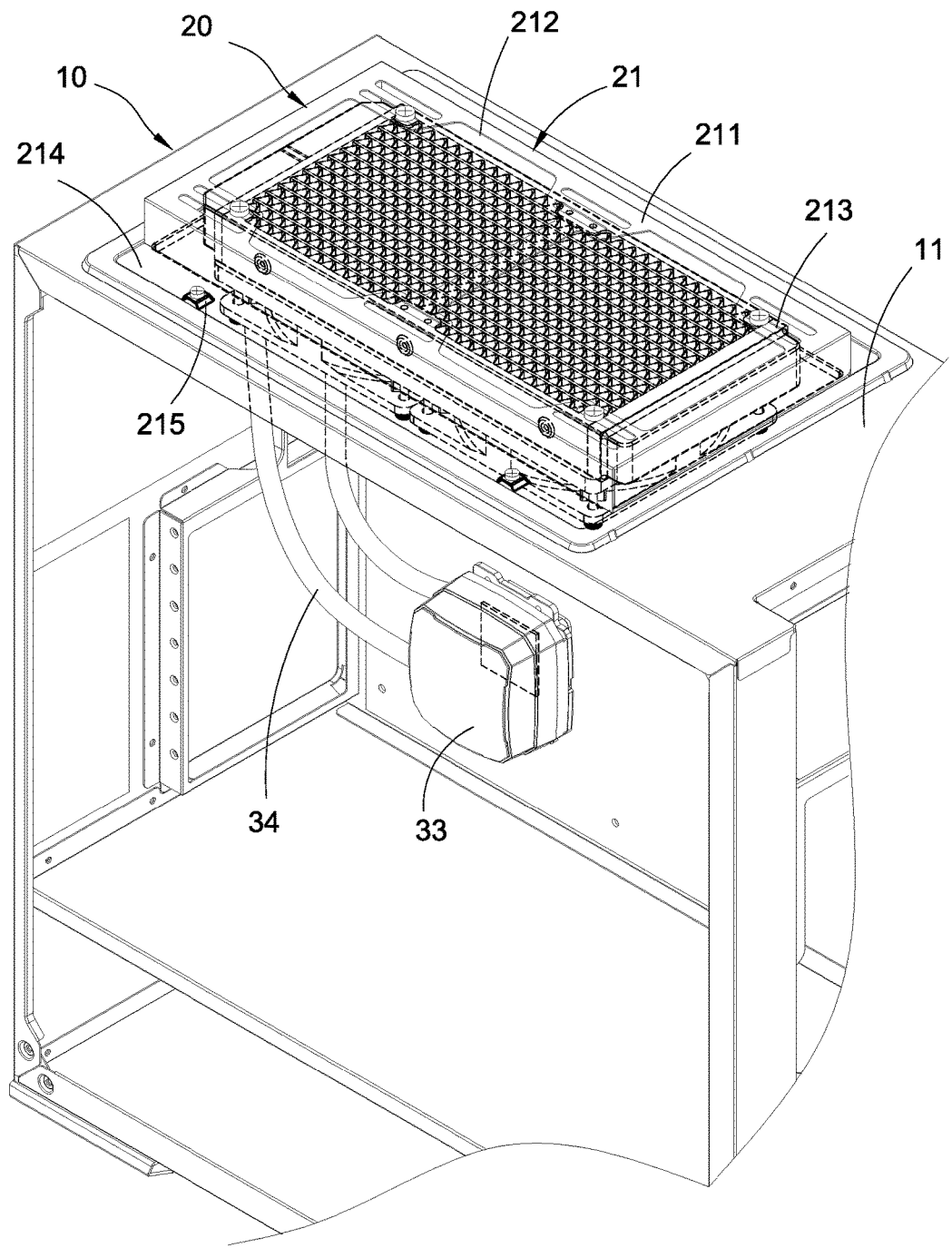
FIG. 4 is a perspective view of the combination of the computer case according to the second embodiment of the disclosure.

Referring to FIG. 3 and FIG. 4, the computer case of another embodiment of the disclosure may further comprise a cooler 30. The cooler 30 is fixed to the carrying structure 20, and a part of the cooler 30 located in the accommodation space 217. The cooler 30 may be a combination of a liquid-cooled radiator 31, a cooling fan 32, the liquid-cooled radiator 31 and a cooling fan 32 or a combination of a liquid-cooled radiator 31, a cooling fan 32 and a waterblock 33. The cooler 30 of this embodiment mainly comprises a liquid-cooled radiator 31, two cooling fans 32 and a waterblock 33. The liquid-cooled radiator 31 goes through each of the aforementioned striped grooves 213 and is locked onto the bottom of the stand 21 via a screwing member such as a screw. Each cooling fan 32 is also locked onto the bottom of the liquid-cooled radiator 31 via a screwing member such as a screw and corresponds to the arrangement of the aforementioned apertures 212. The waterblock 33 connects with the liquid-cooled radiator 31 via two liquid tubes 34. A pump and passages are disposed inside the waterblock 33 (not shown in the figures) and the waterblock 33 is installed on the motherboard in a manner corresponding to the position of the heat source.

Figure 5:
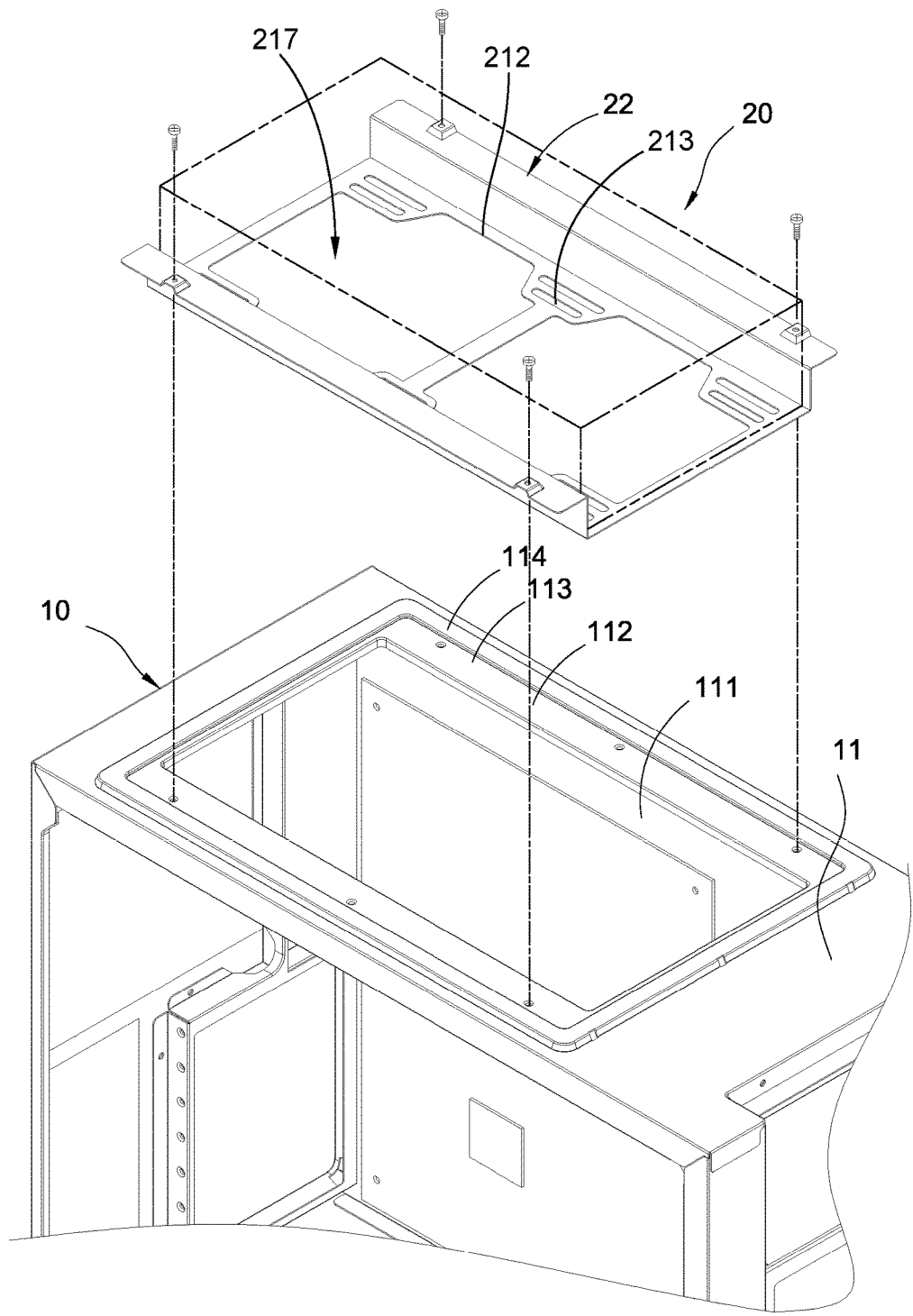
FIG. 5 is an exploded view of a computer case according to the third embodiment of the disclosure.

As seen in FIG. 5, the carrying structure 20 of this embodiment is a U-shaped frame 22 which is basically similar to the structure of the stand 21 mentioned before. However, the opening of the U-shaped frame 22 faces the outside of the case body 10. A part of the U-shaped frame 22 is sunken into the case body 10. This way, each component of the cooler 30 may be changed without disassembling the U-shaped frame 22, which makes the installation processes easier.

Figure 6:
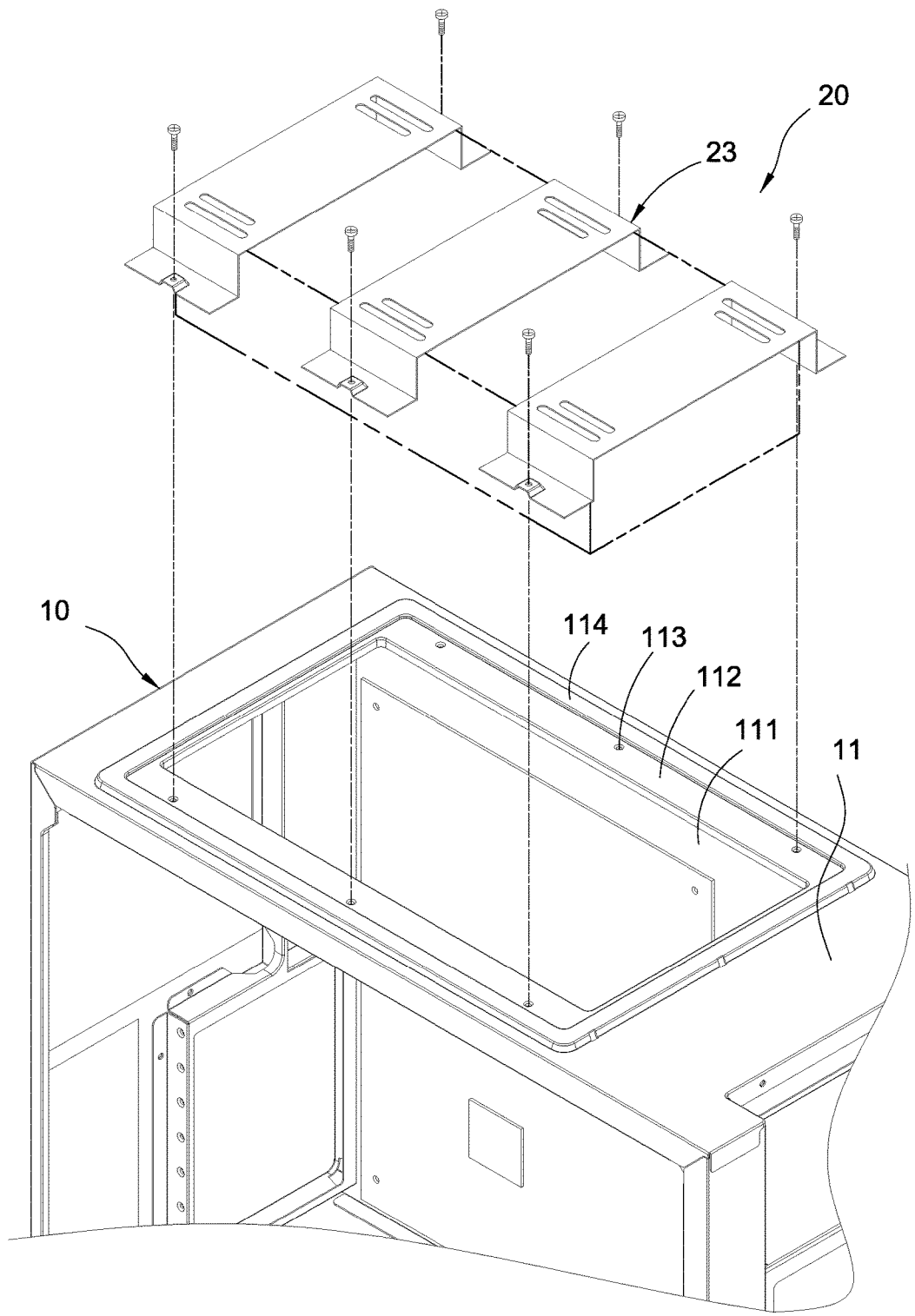
FIG. 6 is an exploded view of a computer case according to the fourth embodiment of the disclosure.
Figure 7:
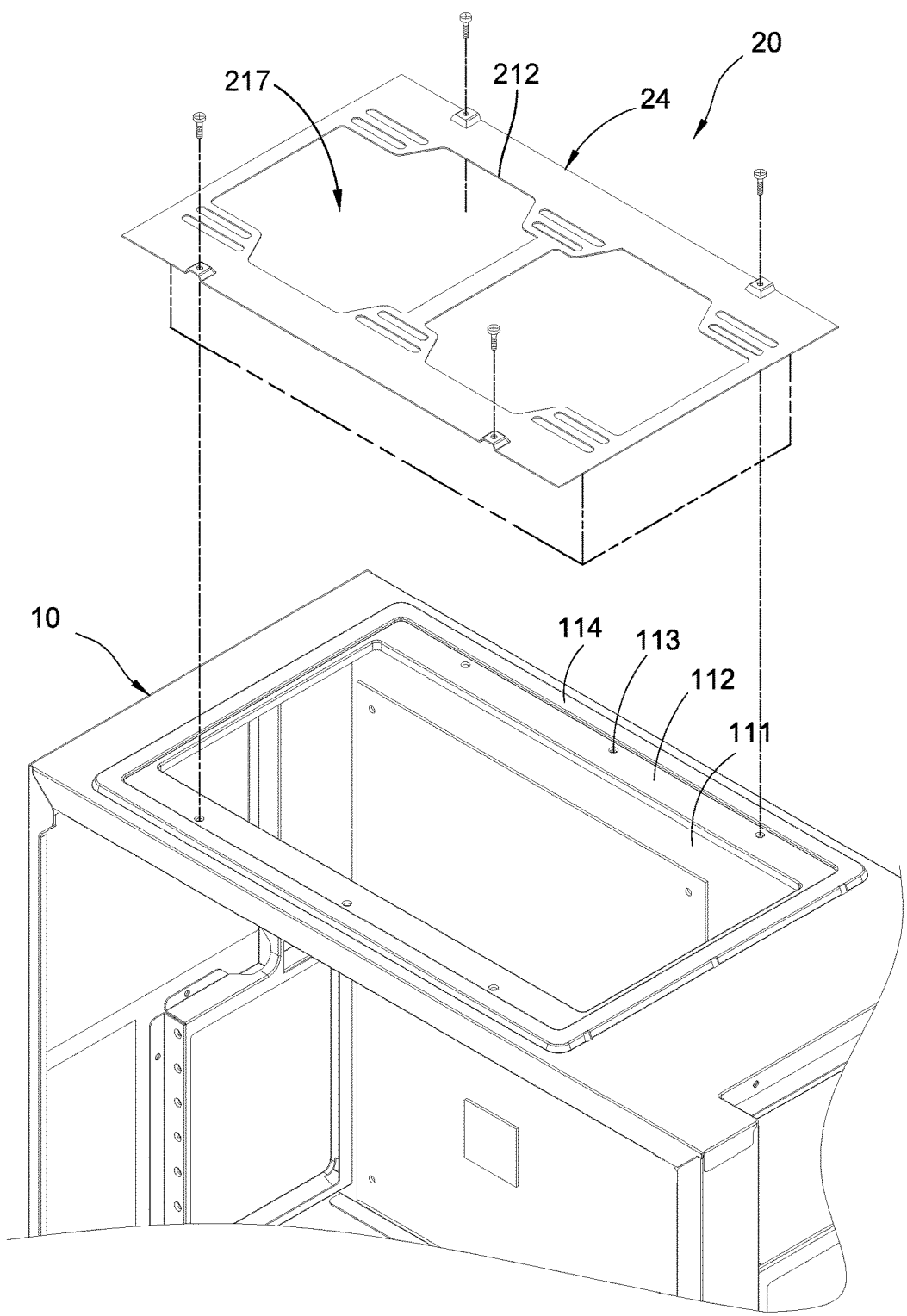
FIG. 7 is an exploded view of a computer case according to the fifth embodiment of the disclosure.
Figure 8:
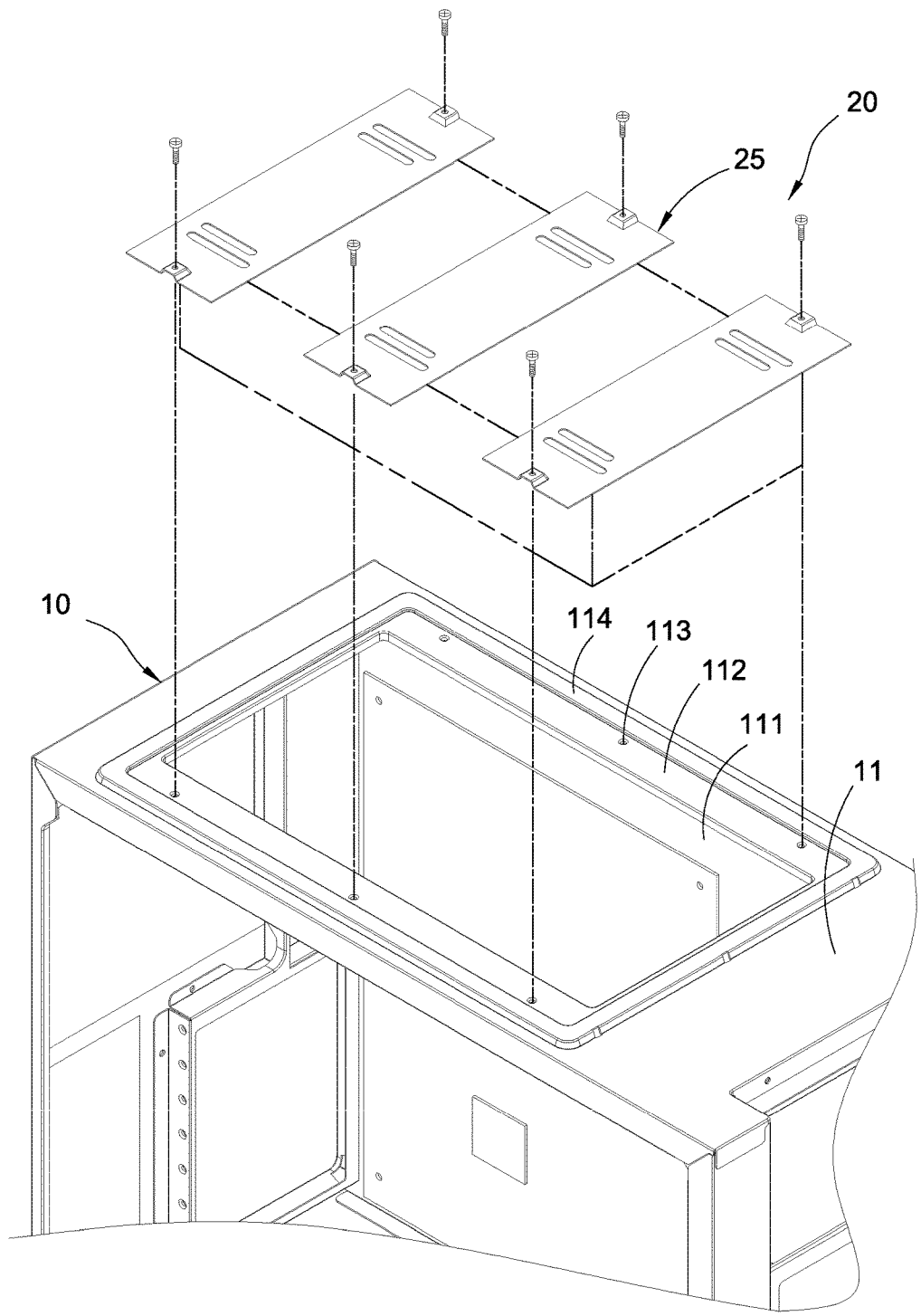
FIG. 8 is an exploded view of a computer case according to the sixth embodiment of the disclosure.

Referring to FIG. 6 to FIG. 8, the carrying structure 20 of the embodiment of FIG. 6 comprises three reversed U-shaped plates each spaced apart from each other and locked onto the case body 10 via a screwing member such as a screw. The carrying structure 20 of the embodiment of FIG. 7 is a plate 24 which is also locked onto the case body 10 via a screwing member such as a screw. The carrying structure 20 of the embodiment of FIG. 8 comprises three rectangular plates 25 each spaced apart from each other and locked onto the case body 10 via a screwing member such as a screw.

What is claimed is:

1. A computer case, comprising:
a case body has a top plate and the top plate with an opening formed thereon;
a carrying structure detachably connected to the case body from the outside and corresponding to the position of the opening, the carrying structure having at least one aperture, and the opening and the at least one aperture communicated with each other; and
a cooler fixed to the carrying structure.

2. The computer case according to claim 1, wherein the carrying structure further has an accommodation space, the opening, the accommodation space and the at least one aperture are communicated with each other, the accommodation space is located between the opening and the at least one aperture, and at least a part of the cooler is located in the accommodation space.

3. The computer case according to claim 2, wherein a carrying edge is formed on the edge of the opening, the carrying structure is a stand, the stand comprises a rectangular frame and a lapping piece extending from two corresponding sides of the rectangular frame, the accommodation space is defined by the rectangular frame, the at least one aperture is located on the rectangular frame, and two opposite ends of the lapping piece laps over the carrying edge.

4. The computer case according to claim 3, wherein the outer peripheral edge of the carrying edge forms a rectangular rim, and each lapping piece is restricted by the rectangular rim.

5. The computer case according to claim 3, wherein the cooler comprises a liquid-cooled radiator, a cooling fan and a waterblock, the liquid-cooled radiator is locked on the stand via a screwing member, the cooling fan is locked on the liquid-cooled radiator via a screwing member, and the waterblock connects with the liquid-cooled radiator via two liquid tubes.

6. The computer case according to claim 3, wherein the carrying edge forms a plurality of screwing holes, the lapping piece forms a plurality of protruding portions, the protruding portion forms a through hole for a screwing member to go through the through hole as well as the screwing hole and to be locked.

7. The computer case according to claim 2, wherein the cooler comprises at least one of a liquid-cooled radiator and a cooling fan.

8. The computer case according to claim 2, wherein the carrying structure is a U-shaped frame while the opening of the U-shaped frame facing towards the outside of the case body.

9. The computer case according to claim 2, wherein the carrying structure lapping over the opening.

10. The computer case according to claim 2, wherein a part of the carrying structure sunken into the case body.

11. The computer case according to claim 2, wherein a part of the carrying structure protruded from the case body.

12. A computer case, comprising:
a case body has a top plate and the top plate with an opening formed thereon; and
a carrying structure detachably connected to the case body from the outside and corresponding to the position of the opening, the carrying structure having an accommodation space and at least one aperture, the opening, the accommodation space and the at least one aperture communicated with each other, and the accommodation space located between the opening and the at least one aperture.

13. The computer case according to claim 12, wherein a carrying edge is formed on the edge of the opening, the carrying structure is a stand, the stand comprises a rectangular frame and a lapping piece extending from two corresponding sides of the rectangular frame, the accommodation space is defined by the rectangular frame, the at least one aperture is located on the rectangular frame, and the lapping piece laps over the carrying edge.

14. The computer case according to claim 13, wherein the outer peripheral edge of the carrying edge forms a rectangular rim, and each lapping piece is restricted by the rectangular rim.

15. The computer case according to claim 13, wherein the carrying edge forms a plurality of screwing holes, the lapping piece forms a plurality of protruding portions, the protruding portion forms a through hole for a screwing member to go through the through hole as well as the screwing hole and to be locked.

16. The computer case according to claim 12, wherein the carrying structure is a U-shaped frame while the opening of the U-shaped frame facing towards the outside of the case body.

17. The computer case according to claim 12, wherein the carrying structure lapping over the opening.

18. The computer case according to claim 12, wherein a part of the carrying structure sunken into the case body.

19. The computer case according to claim 12, wherein a part of the carrying structure protruded from the case body.

20. A computer case, comprising:
- a hollow frame having a top plate with an opening formed thereon, and an edge of the opening forming a carrying edge;
- a carrying structure detachably connected to the carrying edge of the hollow frame from the outside and corresponding to the position of the opening, the carrying structure having an accommodation space and at least one aperture, the opening, the accommodation space and the at least one aperture communicated with each other, and the accommodation space located between the opening and the at least one aperture; and
- a cooler fixed to the carrying structure, and at least a part of the cooler located in the accommodation space.

* * * * *